(12) United States Patent
Chew

(10) Patent No.: US 10,227,243 B2
(45) Date of Patent: Mar. 12, 2019

(54) SYSTEM AND METHOD FOR PREVENTION OF ADHESION OF ORGANISMS IN WATER TO A SUBSTRATE IN CONTACT WITH WATER

(75) Inventor: Hwee Hong Chew, Singapore (SG)

(73) Assignee: ECOSPEC GLOBAL TECHNOLOGY PTE. LTD, Singapore (SG)

( * ) Notice: Subject to any disclaimer, the term of this patent is extended or adjusted under 35 U.S.C. 154(b) by 410 days.

(21) Appl. No.: 14/415,263

(22) PCT Filed: Aug. 28, 2012

(86) PCT No.: PCT/SG2012/000302
§ 371 (c)(1),
(2), (4) Date: Jan. 16, 2015

(87) PCT Pub. No.: WO2014/035332
PCT Pub. Date: Mar. 6, 2014

(65) Prior Publication Data
US 2015/0232352 A1    Aug. 20, 2015

(51) Int. Cl.
*C02F 1/48* (2006.01)
*B63B 59/04* (2006.01)

(52) U.S. Cl.
CPC ............. *C02F 1/487* (2013.01); *B63B 59/04* (2013.01); *C02F 2201/48* (2013.01); *C02F 2303/20* (2013.01)

(58) Field of Classification Search
CPC .......... C02F 1/4608; C02F 1/48; C02F 1/487; C02F 2201/46175;
(Continued)

(56) References Cited

U.S. PATENT DOCUMENTS

| 994,405 | A | | 6/1911 | James | |
| 5,575,974 | A | * | 11/1996 | Wurzburger | C02F 1/46104 204/232 |

(Continued)

FOREIGN PATENT DOCUMENTS

| JP | 2000212782 A | * | 8/2000 | .............. C23F 15/00 |
| JP | 2004183018 | | 7/2004 | |

(Continued)

OTHER PUBLICATIONS

Machine translation of JP 2000-212782.*
(Continued)

*Primary Examiner* — Alexander W Keeling
(74) *Attorney, Agent, or Firm* — Hanre, Schumann, Mueller & Larson, P.C.

(57) ABSTRACT

The present invention provides a system for prevention of adhesion of organisms in water to a substrate in contact with the water, wherein the substrate and the water flowing around the substrate form together a treated region, comprising a generator for producing electromagnetic wave having a time varying frequency, in electrical connection with a first excitation site of the treated region and with an avalanche current suppressor having its another terminal connected with a second excitation site of the treated region. A selected voltage is applied to the generator such that the generator is triggered to produce the electromagnetic wave capable of inducing an avalanche current to shock or kill the organisms. The invention also provides a method for prevention of adhesion of organisms in water to a substrate in contact with the water.

22 Claims, 3 Drawing Sheets

(58) Field of Classification Search
CPC ....... C02F 2201/48–2201/486; C02F 2303/20; B63B 59/04
USPC .......... 204/196.01, 196.26, 196.37; 205/705, 205/710–711, 724, 740
See application file for complete search history.

(56) References Cited

U.S. PATENT DOCUMENTS

| | | | |
|---|---|---|---|
| 6,209,472 | B1 | 4/2001 | Staerzl |
| 7,033,481 | B1* | 4/2006 | Schlager ................ C02F 1/008 204/228.3 |
| 7,931,813 | B2* | 4/2011 | Asokan .................... A61L 2/02 205/722 |
| 2003/0057086 | A1* | 3/2003 | McLaine ............... B01J 19/088 204/164 |
| 2005/0069011 | A1 | 3/2005 | Hill |
| 2006/0180463 | A1* | 8/2006 | Schlager ................ C02F 1/008 204/275.1 |
| 2007/0029261 | A1* | 2/2007 | Chew ........................ C02F 1/48 210/695 |
| 2009/0038944 | A1* | 2/2009 | Kruger .................. C02F 1/4602 204/555 |

FOREIGN PATENT DOCUMENTS

| | | |
|---|---|---|
| RU | 2019320 | 9/1994 |
| WO | WO 2004/071863 | 8/2004 |

OTHER PUBLICATIONS

BBC (How is mains electricity produced?, 2011, http://www.bbc.co.uk/schools/gcsebitesize/science/add_ocr_pre_2011/electric_circuits/mainsproducedrev5.shtml).*

Streets (Magnetic forces review, 2010, http://www.physics.umd.edu/courses/Phys122/Streets/25_EM_Induction_and_Waves.pdf).*

Boston University (Electromagnetic waves, 1999, http://physics.bu.edu/~duffy/PY106/EMWaves.html).*

Reed ("Construction of a Low Budget 180 Mhz Rf Sweep Generator", Nuts and Volts, 2013, pp. 1-22). (Year: 2013).*

* cited by examiner

SYSTEM AND METHOD FOR PREVENTION OF ADHESION OF ORGANISMS IN WATER TO A SUBSTRATE IN CONTACT WITH WATER

FIELD OF THE INVENTION

This invention relates generally to the field of prevention of organisms in water from attaching themselves to a substrate exposed to water, and more particularly, to system and method for prevention of adhesion of organisms to a substrate, such as ships' hulls, marine vessels, pipelines, in contact with water by use of avalanche current induced by electromagnetic wave having a time varying frequency.

BACKGROUND OF THE INVENTION

Biofouling or biological fouling is the undesirable settling, attaching and growing of microorganisms, plants, algae and/or animals on submerged marine surfaces. The biofouling of submerged marine surfaces by marine organisms is a well-known problem. If the accumulation of marine growth on the ships is not controlled, it can drastically reduce the ship's speed, increase fuel consumption, and clog up the seawater cooling, or any seawater intake and discharge lines. Apart from the ship applications, biofouling control is also necessary for seawater cooling systems such as power station seawater cooling water intake and condenser cooling systems.

In addition to the biofouling attachment, in many industrial plant installations, it is necessary to prevent the intrusion of marine organisms into the seawater cooling system. For examples, the massive shrimps intrusion into the power plant cooling system can possibly choke up the filter screens or gates and cause shutdown of the plant.

Various methods have been developed to tackle the above problem, in order to remove the accumulation or prevent the accumulation of the marine organisms. One of these methods is the use of toxic chemicals, paints and metal ionization to control the biofouling, which are however harmful to the environment. Another method is electrical methods which are used for control or prevention of adhesion of organisms. For example, the electrical methods may be known from WO 2004/071863, U.S. Pat. No. 6,209,472, and JP 2004183018.

WO 2004/071863 discloses an anti-fouling and eliminating system against aquatic organisms, which includes one or more anode and cathode installed at a portion of a marine structure, and at least one pulse generator electrically connected to the anode and the cathode. The biofouling effect is derived from the high or low electrical field generated between the anode and the cathode, and is relying on the ions carrying current flowing through the water across the two electrodes. The system of this patent application has a significant drawback that the biofouling effect cannot be realized outside of the space between the anode and the cathode.

In WO 2004/071863A, the pulse generator produces a DC pulsed current which is discharged from the anode submerged in the water to the submerged cathode via the electrolyte such as seawater. As such, chlorine gas or hypochlorite will be generated in water at or near the electrodes surface and the killing of the bio-organism will in fact be contributed mainly from these environmentally harmful chlorination produced by the DC pulsed wave current instead of being fully contributed by the pulsed wave shocking or kill effect.

JP 2004183018 relates to an antifouling device which realizes an electrochemical antifouling effect by the use of controlling current between an electroconductive substrate and a counter electrode constant. It is essentially a DC impressed current system to shift the structure surface to electrolyte potential in order to control the growth or attachment of organisms, and the anode and the cathodes are alternated periodically. Similar to WO 2004/071863, when DC current is applied in the water, chlorine gas or hypochlorite will be generated and it becomes an environment unfriendly chemical disinfection process. It shall be noted that other chemicals or coatings are involved in this patent application.

U.S. Pat. No. 6,209,472 discloses a system for inhibiting marine organism growth on underwater surface, comprising an electric current generator which causes an electric current to flow proximate the underwater surface, a source of power, such as a battery, providing electrical power to the electric current generator, wherein the flow of current passes from the underwater surface through water surrounding the surface or in contact with the surface, and a point of ground potential. Again, this system is using a pulsed DC generator to produce the chlorine or hypochlorite to control the organism growth.

The above antifouling methods and systems use either direct current (DC) or DC pulsed wave or DC component. When the DC pulsed or DC current is discharging from the electrodes in the electrolyte (e.g. seawater), active substances such as chlorine gas, hydroxyl ions, hypochlorite, or other disinfection by-products will be generated. The generation of all these substances is in fact of no difference from the chemical-based methods such as electro-chlorination which are harmful to the environment. According to International Marine Organization (IMO) regulations, the generation of such substances is deemed to be undesirable and the water treated by these methods and systems must go through additional assessment procedures, including environmental impact assessment to ensure that the negative impact is kept to the minimum.

Another disadvantage of the above methods and systems is that they are based on conventional DC electrolysis concepts to follow the Ohm's Law, which does not apply to AC circuits. That is, the electrical current flowing through the circuit loop including the current path in water is always constant and determined by the total circuit resistance. If the circuit resistance is constant, the current flow will be maintained constant unless the driving voltage is changed. According to the Ohm's Law, the current flow in the electrolyte such as water is characterized by the "current taking the lowest resistance and shortest path" and exhibits a current sink-and-source potential distribution pattern. There is no electron flows within the water and all current flowing in the water is via the conduction of ions. When the current flow follows the conventional current flow, there are many blind spots or zones in the electrolyte, where the conventional ohmic or ionic current cannot reach. Typically these blind spots are areas located outside the sink-to-source potential field.

FIG. 1 shows a schematic diagram of an antifouling arrangement based on the conventional DC component. As shown, an anode 1 and an cathode 2 are submersed in the water in a spaced relation, and the positive and negative of a DC or DC pulsed source 3 is coupled electrically to the anode 1 and the cathode 2, respectively, to create an electrical field 4 between the anode 1 and the cathode 2. A conventional DC or DC pulsed current flows in the electrical field 4 between the anode 1 and the cathode 2. It is clear in FIG. 1 that the conventional DC or DC pulsed current is unable to reach the areas 51, 52, 53 and 54 that are away from the electrical field between the anode and the cathode. If there are such blind areas, bacteria and micro-organisms would survive and grow well at these blind areas and the bio-fouling control will be less effective.

It has been always a major challenge to develop alternative technologies for the current anti-fouling methods and systems, in order to prevent fouling on the submerged substrates such as ship's hulls, or the substrates in contact with water such as platform structures, seawater cooling water systems, buoys. To this end, there is a need for a device and a method for prevention of adhesion of organisms in water to a substrate in contact with water, which is constructively very simple, relatively inexpensive and more environmentally sound without leaching toxins, irrespective of whether the substrate is stationary or moving, however, allows an efficient control or prevent attachment of unwanted organisms.

SUMMARY OF THE INVENTION

The present invention has been developed to fulfill the needs noted above and therefore has a principle object of the provision of a system for prevention of adhesion of organisms in water to a substrate in contact with the water which is environmentally sound and does not leach toxins into the water.

Another object of the invention is to provide a system for prevention of adhesion of organisms in water to a substrate in contact with the water which is significantly more economical and convenient to utilize.

A yet further object of the invention is to provide a system for prevention of adhesion of organisms in water to a substrate in contact with the water which allows an efficient control or prevention of attachment of unwanted organisms.

These and other objects and advantages of the invention are satisfied by providing a system for prevention of adhesion of organisms in water to a substrate in contact with the water, wherein the substrate and the water flowing around the substrate form together a treated region, comprising:

a generator for producing electromagnetic wave having a time varying frequency, said generator having at least two output terminals, one of which in electrical connection with a first excitation site of the treated region;

an avalanche current suppressor with its one terminal in electrical connection with the other of the outputs of the generator and with its another terminal connected with a second excitation site of the treated region; and an electric power source connected to the generator for applying a selected voltage to the generator, wherein the voltage is applied such that the generator is triggered to produce the time varying frequency electromagnetic wave capable of inducing an avalanche current in the water and/or on a surface of the substrate to shock or kill the organisms.

According to the invention, the substrate may be made of an electrically conductive material or an electrically non-conductive material. For the electrically non-conductive substrate, one or more metallic element may be provided at the respective excitation site so as to be electrically connected with the generator or the suppressor, if this excitation site is positioned on the non-conductive substrate. Alternatively, an electromagnetic wave emitter may serve the same purpose as the metallic element.

The positions of the first and second excitation sites may be varied according to the actual needs and requirements.

The two excitation sites may be arranged on a same surface of the substrate in a spaced relation or on two different surfaces of the substrate. It is possible that one of the first and second excitation sites is positioned on a surface of the substrate, and the other is positioned in the water.

Preferably, an emitter may be provided at one or each of both of the first and second excitation sites, and the first and second excitation sites are electrically connected with the generator and the suppressor through the emitters.

In the case of the substrate of an electrically non-conductive material, the treated region is preferably enclosed fully or partially, in order to enhance the avalanche wave current flux density.

Advantageously, the frequency of the time varying frequency electromagnetic wave is between about 100 Hz and about 1 MHz, preferably between about 100 Hz and about 200 KHz. The electromagnetic wave has preferably a sweeping frequency between about 1 Hz and about 1 KHz.

The avalanche current suppressor is provided to suppress or control the exponential increasing avalanche current. The suppressor may be selected from the group consisting of digital or analog RLC circuit, inductance circuit, capacitor circuit, LC circuit, RL circuit and RC circuit designs to suit different load requirements for different applications. One example of the suppressor is a series RLC circuit containing a resistor (R), an inductor (L) and a capacitor (C), the characteristic of the series RLC circuit is that the magnitude of the current is a function of frequency and the current reaches maximum value at the resonance frequency, thereby achieving the effect of limiting the amount of current in the treated region defined by the substrate and the water flowing around the substrate.

The voltage to trigger the production of the avalanche current can be very small. In one embodiment of the invention, the electric power source supplies to the electromagnetic wave generator a peak to peak voltage between about 24V to 200V as the trigger voltage.

Another aspect of the invention is to provide a method for prevention of adhesion of organisms in water to a substrate in contact with the water, wherein the substrate and the water flowing around the substrate form together a treated region, comprising the steps of:

providing a generator for producing electromagnetic wave having a time varying frequency, subjecting the treated region to the generated time varying frequency electromagnetic wave, wherein a selected voltage is applied to the generator such that the generator is triggered to produce the time varying frequency electromagnetic wave capable of inducing an avalanche current in the water and/or on a surface of the substrate to shock or kill the organisms, and suppressing the avalanche current through the treated region.

Unlike the conventional DC component-based systems to prevent the adhesion of organisms effective in constrained areas of the water, the essence of the invention is to use the avalanche current, a self-sustained sharply increasing current pulse, produced by the time varying electromagnetic wave on the surface of the substrate or in the water. The avalanche current does not rely on ions to carry the current within the water, instead it is the combined result of electrons and charged particles bombardment taking place in the water. It is found that the receptors on the cell membranes of the organisms are thermally or physiologically averse to the electron avalanche and exited atoms in the substrate, thereby preventing the attachment of microorganisms, algae, bio-film and other species onto the surface of the substrate.

Thus, the antifouling of organisms is achieved without causing any harm to the environment ecological conditions.

The conventional DC component-based system is characterized by the anode and cathode arrangement in connection with the positive and negative terminals of the power source. In contrast, there is no electrode arrangement in the present invention and the electromagnetic wave generated is a pure AC wave, and the output of the electromagnetic wave generator can be connected directly onto the same piece of metal without causing the problem of short circuiting.

To have a better understanding of the invention reference is made to the following detailed description of the invention and embodiments thereof in conjunction with the accompanying drawings.

DETAILED DESCRIPTION OF THE PREFERRED EMBODIMENTS

Figure 1:
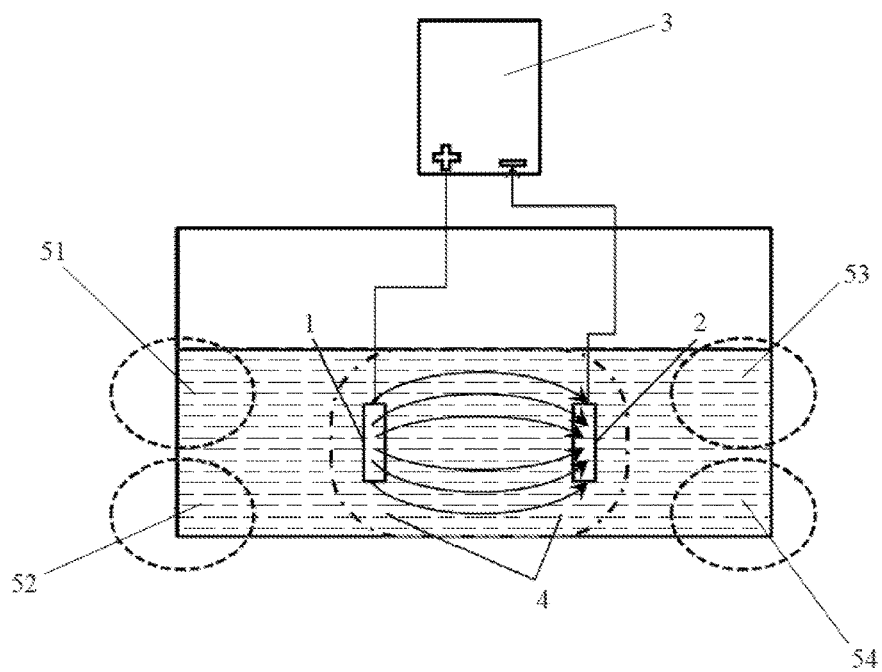
FIG. 1 is a schematic view of an exemplary arrangement known in the prior art.

While this invention is illustrated and described in preferred embodiments, the system for prevention of adhesion of organisms in water to a substrate in contact with the water may be produced in many different configurations, sizes, forms and materials.

Conventionally, it is believed that an avalanche current only takes place in vacuum or in gas plasma discharge from which electron-hole pairs are more easily created, and that the avalanche current will not occur in water or on metal surface. The invention is based on the finding that the avalanche current can be created in water as well as in metal by exciting the water or the metal using the time varying pulsed low frequency electromagnetic wave. With the production of the avalanche current in the water, electrons and charged particles are bombarded in an "avalanche" manner without following the "conventional sink and source" potential distribution and current flow characteristic. The behavior of the electrons and charged particles is similar to the electron bombardment in a fluorescent tube. In order to control and limit the avalanche current through the water and the substrate, an avalanche current suppressor is therefore needed to be incorporated into the invention.

Due to the random bombardment of the electrons and the charged particles, the avalanche current will reach out to the fine gaps and corners within the water mass or the surface of the substrate. Since the avalanche current travels within the entire bulk water, it would either kill or shock the organisms effectively in the water including reaching out to all the blind spots and areas in water not reachable by the conventional DC component-based systems.

When the avalanche current takes place on the surface of the invention, the surface becomes "excited" or "hot" and deters the attachment or adhesion of the organisms. The avalanche current effect can be seen both on the surface of the substrate and in the water of the entire treated region, with the result that the environment is hostile to the organisms in every part of the substrate in contact with the water. No chemicals or active substances are introduced into the water.

It is also found that the avalanche current would bounce to and from within the electrically non-conductive chamber which is fully enclosed (such as a plastic tank) or partially enclosed (such as non-metallic pipe with open ends). As a result, the measured wave voltage and frequency will be amplified with similar behavior as the magnetron generating high frequency electromagnetic waves in a microwave oven. The amplification in frequency and voltage is beneficial to kill or control the growth of organisms in the water.

The distinguishing feature of the invention is that the avalanche current is induced in water and on the surface of the substrate by the time varying pulsating low frequency alternating electromagnetic waves. The time varying frequency waves contain no direct current component such that no undesirable DC pulsed wave or DC electrolysis effect including chlorine generation or active substance production takes place. In fact, DC pulsed wave or DC electrolysis has another disadvantage of hard chemical scale and biofilm forming at the cathode surface to decrease the active cathode surface area and increase the diffusion resistance for oxygen, which has many negative effects on bio-fouling and organism control. In the invention, the scaling and biofilm formation would not occur since the time varying pulsed low frequency electromagnetic wave is used, and it has also been found that the total residual oxygen (TRO) content and also the disinfection byproduct (DBP) formation in the water after the treatment by the invention show no increment and have no harmful impact to the environment. This allows for eliminating the necessity of receiving the active substance assessment in IMO type approval.

For the sake of clarity and convenience, "marine organisms" in seawater is taken herein as one example of organisms that attach onto a substrate in contact with the seawater. It would be appreciated that the organisms in any other electrolytes are applicable.

Figure 2:
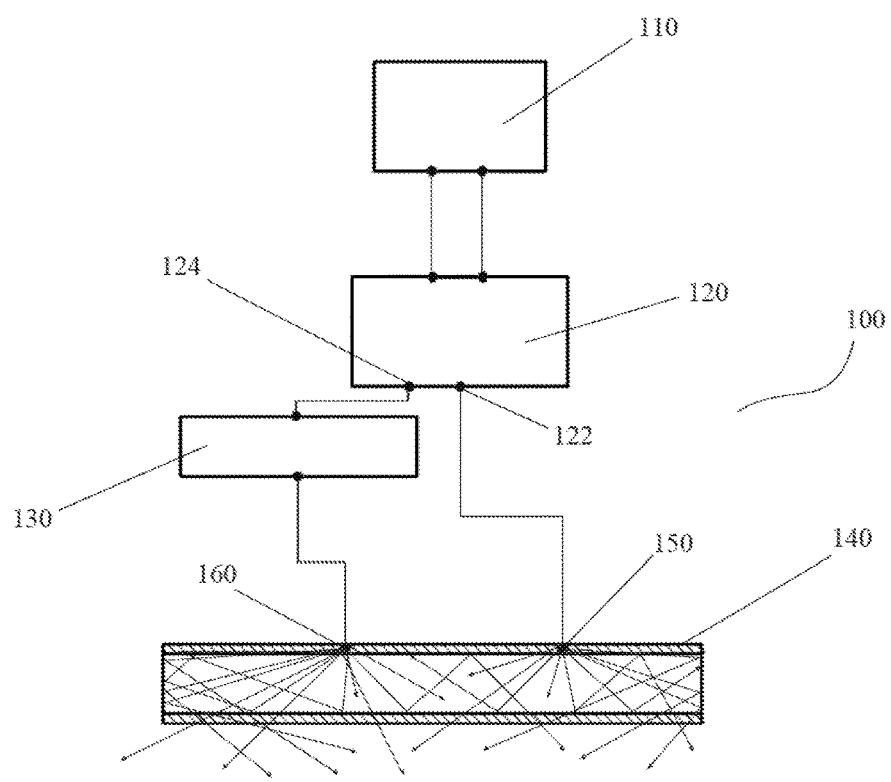
FIG. 2 is a schematic view of a system for prevention of adhesion of marine organisms to a substrate in contact with seawater, which is constructed in accordance with a first embodiment of the invention.

Referring now to the drawings, FIG. 2 provides a system 100 constructed consistent with a first embodiment of the present invention. In this embodiment, the system 100 comprises a power supply unit 110, a generator 120 for producing electromagnetic wave having a time varying frequency, an avalanche current suppressor 130, a metal pipe 140 such as a steel pipe into which the seawater flows. The pipe 140, the seawater flowing into the pipe and the water flowing outside but around the pipe constitute a treated region which is subject to the treatment of electromagnetic field having a time varying frequency.

The power supply unit 110 is electrically connected to the generator 120. AC power supply is used in the power supply unit 110. The power supply unit 110 supplies an AC voltage to trigger the production of the avalanche current in the water and/or on a surface of the pipe 140 for the anti-fouling purpose. The power supply unit 110 preferably supplies to the generator 120 a peak to peak voltage between about 24V to about 200V depending on the actual applications. The trigger voltage can be very small. For submerged steel structures in seawater, the minimum peak to peak voltage of about 24V is needed to trigger the avalanche current generation. It would be understood that the higher the trigger voltage is, the stronger the electromagnetic strength outputted by the generator is to trigger the avalanche current.

The generator 120 can be of any type of means known in the art that is able to generate the time varying frequency electromagnetic wave. For example, the generator may be a circuit board, a console card or a ferrite core antenna with a coil wound around the antenna. The generator 120 has two output terminals 122, 124, and the terminal 122 is in electrical connection with the avalanche current suppressor 130.

For control of different organisms in the water, a wide range of frequency is required as different types of organisms respond to different frequency ranges and current strengths. Preferably, the time varying frequency of the electromagnetic wave used in the invention is in the range of 100 Hz to 1 MHz, preferably in the range of 100 Hz to 200 kHz, with the sweeping frequency between about 1 Hz to 1 kHz. The wave form of the time varying frequency electromagnetic wave can be square, triangular, sinusoidal or other forms.

The avalanche current suppressor 130 is provided to suppress the exponential increasing avalanche current. A first terminal of the suppressor 130 is in electrical connection with the output terminal 122 of the generator, and a second terminal of the suppressor 130 is in connection with the pipe 140. The suppressor 130 in the invention is like an electrical ballast used in a fluorescent tube to limit the current through the tube where the electrons travel in vacuum from one end to the other to create the avalanche effect which is shown by an exponential increase in current in the tube. The suppressor 130 can be digital or analog RLC circuit, L circuit, C circuit, LC circuit, RL circuit or RC circuit to suit different load requirements for different applications. In this embodiment, the suppressor is a series RLC circuit whose characteristic is that the magnitude of the current is a function of frequency and the current reaches maximum value at the resonance frequency, thereby achieving the effect of limiting the amount of current in the treated region.

As shown in FIG. 2, the second terminal of the suppressor 130 and the output terminal 122 of the generator 120 are connected with a first excitation site 160 and a second excitation site 150 in spaced relation on the same wall surface of the pipe 140, respectively, without causing the problem of short circuiting. When the trigger voltage is applied to the generator, the time varying pulsed low frequency electromagnetic wave is generated and travels on the wall surface of the pipe 140 and also in the water to induce the avalanche current. It is believed that a non-gaseous discharge plasma phenomenon is taking place in the metallic substance and in the water and the avalanche effect is reflected in the increase in wave current. Therefore, the avalanche current suppressor 130 is required stabilize and limit the current.

After the avalanche current is induced, the electrons and charged particles in the pipe and in the water are bombarded in an avalanche manner so that the current would propagate in all directions in the treated region (see FIG. 2). The electromagnetic wave can travel on the surface of the metal pipe via the skin effect due to the high frequency, which would facilitate the avalanche effect. When the electromagnetic wave travels on the surface, this surface becomes a "hot plate" to the organisms which would choose to remain in the water instead of adhering to the surface. As a consequence, the whole pipe 140 is fully subject to the avalanche current treatment, and adhesion of the marine organisms onto the pipe is effectively prevented. This is unlike the DC component-based systems where the current is flowing only between the anode and the cathode and no current flows outside of the electrolyte space between the anode and the cathode.

Figure 3:
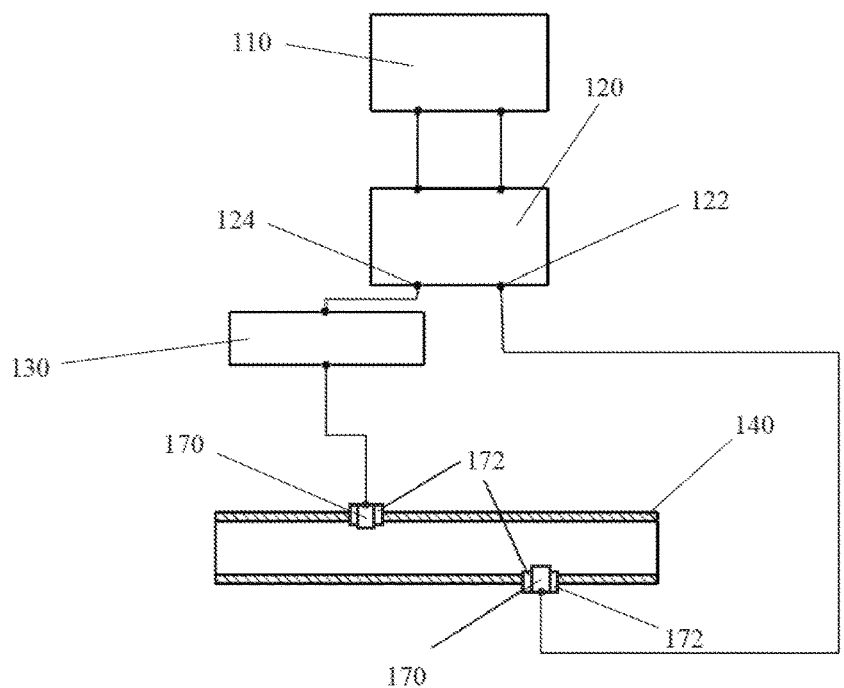
FIG. 3 is a schematic view of a system for prevention of adhesion of marine organisms to a substrate in contact with seawater, which is constructed in accordance with a second embodiment of the invention.
Figure 4:
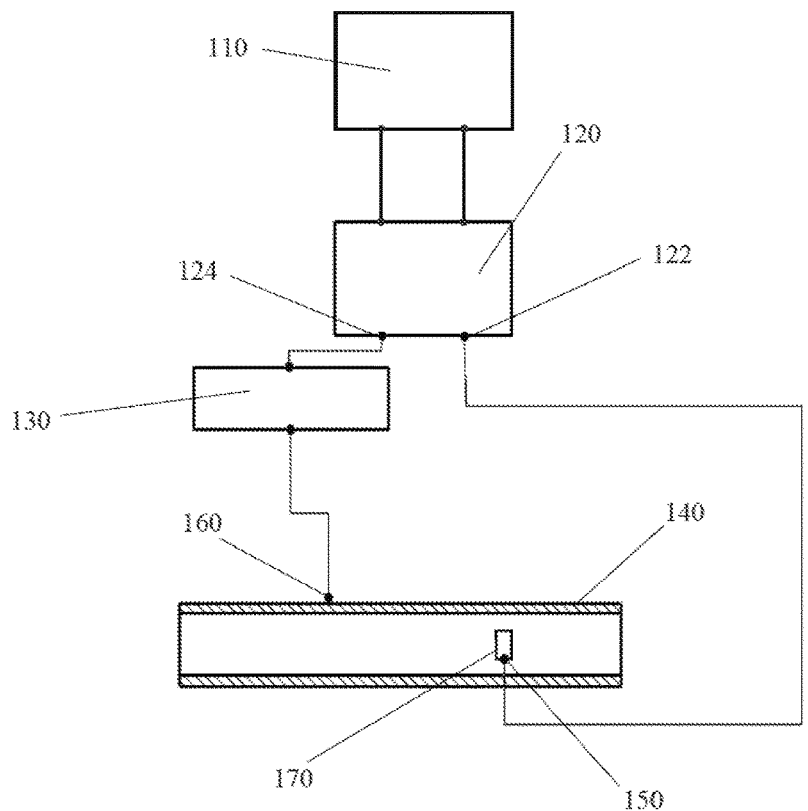
FIG. 4 is a schematic view of a system for prevention of adhesion of marine organisms to a substrate in contact with seawater, which is constructed in accordance with a third embodiment of the invention.

To excite the avalanche current, the output terminals of the generator can be connected to the pipe or to the water in various ways. FIGS. 3 and 4 illustrate second and third exemplary variants of the arrangement in FIG. 2.

In FIG. 3, the first excitation site 160 and the second excitation site 150 are positioned on the two opposite surfaces. In this embodiment, the two output terminals 124, 122 of the generator 120 are connected to the first and second excitation sites 160, 150 through an electromagnetic wave emitter 170 received in a through hole extending through the pipe wall on the first or second excitation site. The emitter 170 enables to strengthen the propagation of the electromagnetic wave along the surface of the pipe and in the water. When the avalanche current is emitting out from the emitter pairs 170, a stronger avalanche effect will be produced and the water to the pipe voltage will be increased by a few volts. In order to guide the avalanche current, an electrically isolating material 172 may be filled between the emitter 170 and the hole. The isolating material 172 allows the time varying frequency electromagnetic wave and the avalanche current to be propagated from the emitter to and along the metal surface via the skin effect.

In FIG. 4, the output terminal 122 of the generator 120 is connected to the water through an electromagnetic wave emitter 170. As illustrated, the emitter 170 is positioned in the water within the pipe 140. This arrangement can also produce the same avalanche effect as shown in FIGS. 1 and 2.

Figure 5:
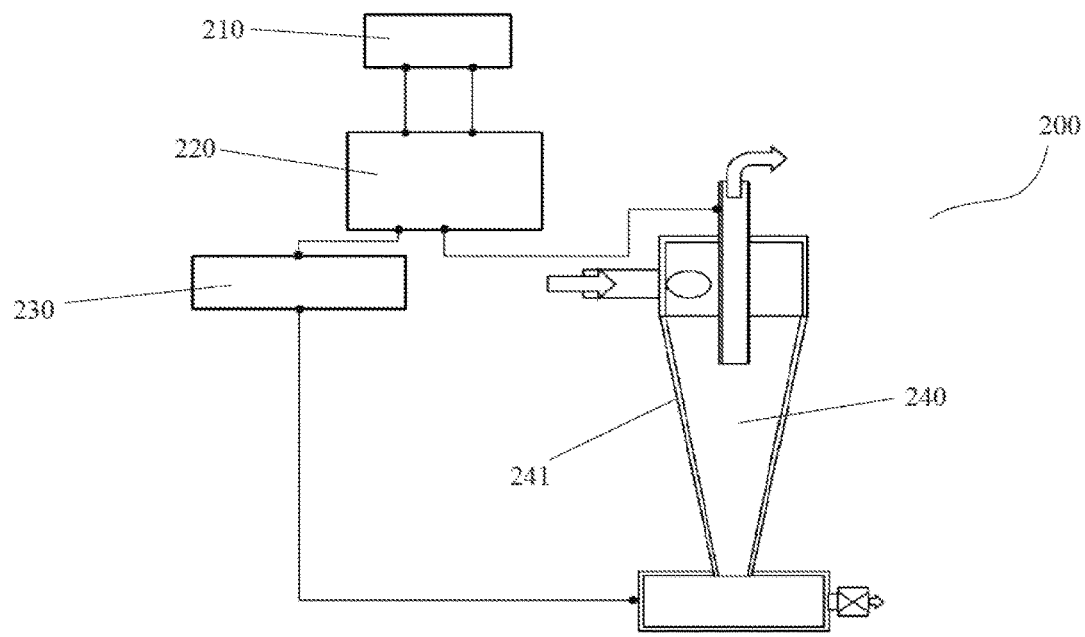
FIG. 5 is a schematic view of a system for prevention of adhesion of marine organisms to a substrate in contact with seawater, which is constructed in accordance with a fourth embodiment of the invention.

Now referring to FIG. 5, there is illustrated a system 200 constructed consistent with a fourth embodiment of the present invention. In this embodiment, the substrate to be treated is a hydro-cyclone housing 241 made of a metal material. Similar to the first embodiment discussed above, the system 200 comprises a power supply unit 210, a generator 220 for producing electromagnetic wave having a time varying frequency, an avalanche current suppressor 230, and a hydro-cyclone 240 containing seawater. The hydro-cyclone housing 241 and the seawater constitute a treated region which is subject to the treatment of electromagnetic field having a time varying frequency.

The description of the power supply unit 210, the generator 220 and the suppressor 230 may be made reference to the corresponding units discussed above in the first embodiments and will be omitted here. As shown, the two output terminals of the generator 220 are connected to the housing 241 at the top and bottom thereof to induce the avalanche current flowing in the water and along the surface of the housing 241. The avalanche current effectively prevents the adhesion of the marine organisms in the water contained in the hydro-cyclone onto the housing 241.

Figure 6:
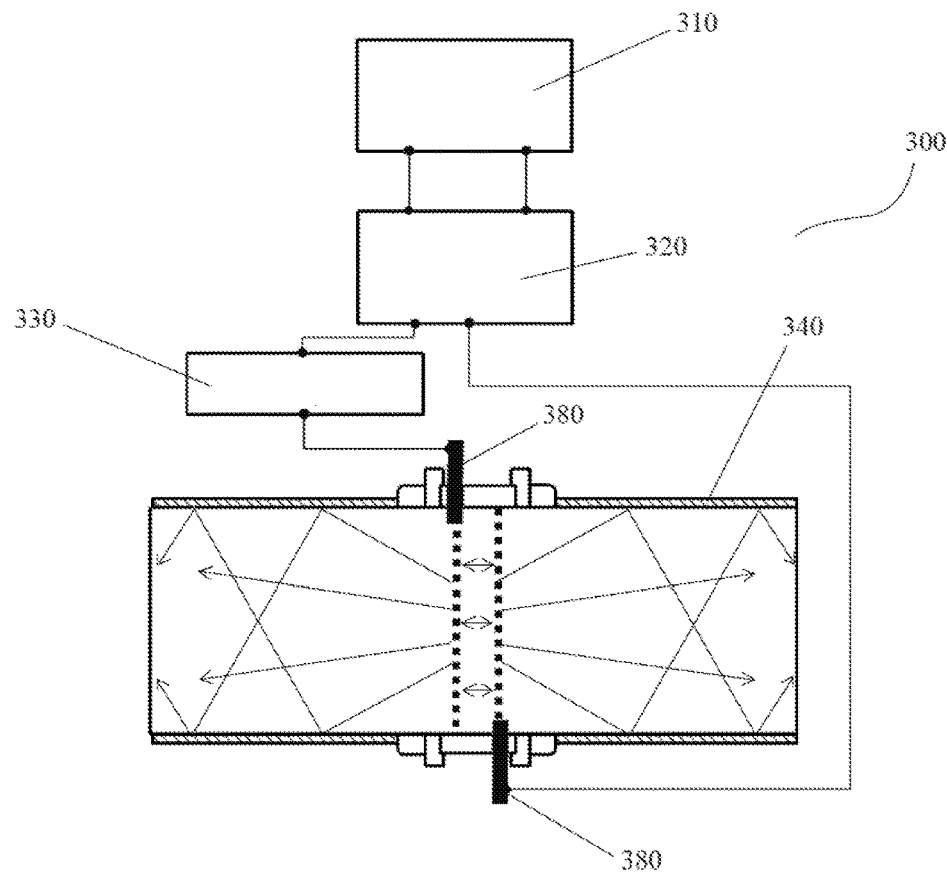
FIG. 6 is a schematic view of a system for prevention of adhesion of marine organisms to a substrate in contact with seawater, which is constructed in accordance with a fifth embodiment of the invention.

FIG. 6 illustrates another system 300 constructed consistent with a fifth embodiment of the present invention. In this embodiment, the system 300 comprises a power supply unit 310, a generator 320 for producing electromagnetic wave having a time varying frequency, an avalanche current suppressor 330, a non-metallic pipe 340 such as a plastic pipe. The arrangement in this embodiment is substantially same as the one shown in the first embodiment discussed above, but differs from the first embodiment in that the pipe is made of a non-metallic material which is electrically non-conductive and that a metal strainer 380 is provided across the pipe cross section. To excite the plastic pipe 340, the output terminals of the generator 320 may be connected to the metal strainer 380 as shown in FIG. 6. Multiple metallic strainers may be used to improve the efficiency.

It would be within the ability of the skilled person in the art that the electromagnetic emitters in place of the metallic strainers may be positioned on the plastic pipe 340 to induce the avalanche current on the surface of the pipe and in the water.

In this embodiment, the avalanche current would travel in the water since the plastic pipe 340 fails to provide a conductive path along which the current flows. In order to produce a significant shocking or killing effect on the organisms, it is advantageous to enclose the whole structure fully or partially to reduce the water volume to an extent. In the enclosed structure, the avalanche current would bounce to and from so that the current is enhanced. All the organisms in the enclosed structure are subject to the avalanche current treatment and prevented from adhering onto the plastic pipe surface.

As can be seen, the invention treats the electrically conductive and non-conductive substrates in two different ways. In the case of a conductive substrate, the time varying frequency electromagnetic wave would travel both in the water and along the conductive path provided by the conductive substrate. The avalanche current induced is strong enough to shock and kill any living organisms in water further in view of the skin effect. Depending on the substrate thickness and the frequency range, the emitters may or may not be provided, and the excitation sites may be varied.

In the case of a non-conductive substrate, the time varying frequency electromagnetic wave would travel in the water only as no conductive path is available. If the excitation sites are placed in the open sea which is infinite, the avalanche wave current flux density is probably weak to effectively control the adhesion of organisms when it is away from the excitation sites. Under this circumstance, it is preferable to enclose the non-conductive substrate fully or partially.

In the case of a conductive substrate well coated with a rubber line for example, this substrate will be treated as a non-conductive substrate. In the case of a conductive substrate coated with a porous non-conductive coating, this substrate will be treated by the methods for conductive and non-conductive substrates in combination.

The invention thus provides a system and a method for prevention of adhesion of organisms onto a substrate in contact with the water which is very simple, relatively inexpensive and more environmentally sound without leaching toxins, and which provides an efficient antifouling result. In this invention, the avalanche current effect is expected to propagate to cover the entire bulk water and the surface of the substrate.

While the embodiments described herein are intended as exemplary arrangements for prevention of adhesion of organisms in water to a substrate in contact with the water, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A system for prevention of adhesion of organisms in water, comprising:
    a substrate in contact with the water, wherein the substrate and the water around the substrate form together a treated region;
    a generator configured to generate a time varying frequency electromagnetic wave capable of inducing an avalanche current in the water and/or on a surface of the substrate, said generator having at least two output terminals, one of which is adapted to be in electrical connection with a first excitation site of the treated region;
    an avalanche current suppressor with its one terminal in electrical connection with the other of the outputs of the generator and with its another terminal adapted to be connected with a second excitation site of the treated region; and
    an electric AC power source connected to the generator to trigger the generator to produce the time varying frequency electromagnetic wave capable of inducing an avalanche current in the water and/or on a surface of the substrate through the first and second excitation sites to electrically shock or kill the organisms without electrodes.

2. The system as claimed in claim 1, wherein the substrate that the system is adapted to treat is made of an electrically conductive material.

3. The system as claimed in claim 1, wherein the substrate that the system is adapted to treat is made of an electrically non-conductive material, and one or more metallic elements are provided at the respective excitation site so as to be electrically connected with the generator or the suppressor.

4. The system as claimed in claim 3, wherein at least one of the one or more metallic elements is formed as a strainer or a screen mesh across a cross section of the substrate that the system is adapted to treat.

5. The system as claimed in claim 1, wherein both the first and second excitation sites are adapted to be positioned on a same surface of the substrate in a spaced relation.

6. The system as claimed in claim 1, wherein both the first and second excitation sites are adapted to be positioned on two different surfaces of the substrate.

7. The system as claimed in claim 1, wherein one of the first and second excitation sites is adapted to be positioned on a surface of the substrate, and the other is positioned in the water.

8. The system as claimed in claim 1, wherein an emitter is provided at one or each of both of the first and second excitation sites, wherein the first and second excitation sites are electrically connected with the generator and the suppressor through the emitters respectively.

9. The system as claimed in claim 1, wherein an electrically isolating material is provided to surround the first and second excitation sites.

10. The system as claimed in claim 1, wherein the substrate that the system is adapted to treat is made of an electrically non-conductive material, and an emitter is provided at the first and/or second excitation sites to be electrically connected with the generator or the suppressor.

11. The system as claimed in claim 1, wherein the substrate that the system is adapted to treat is made of an electrically non-conductive material, and the treated region is enclosed fully or partially.

12. The system as claimed in claim 1, wherein the frequency of the electromagnetic wave is between about 100 Hz and about 1 MHz.

13. The system as claimed in claim 1, wherein the electromagnetic wave has a sweeping frequency between about 1 Hz and about 1 KHz.

14. The system as claimed in claim 1, wherein the suppressor is selected from the group consisting of RLC circuit, inductance circuit, capacitor circuit, LC circuit, RL circuit and RC circuit.

15. The system as claimed in claim 1, wherein the electric power source supplies to the generator a peak to peak voltage between about 24V to 200V as the trigger voltage.

16. The system as claimed in claim 1, wherein the frequency of the electromagnetic wave is between about 100 Hz and about 200 KHz.

17. The system as claimed in claim 1, wherein the generator is selected from the group consisting of a circuit board, a console card, and a ferrite core antenna with a coil wound around the ferrite core antenna.

18. A method of using the system of claim 1 for prevention of adhesion of organisms in water comprising:

provic the generator for producing the electromagnetic wave having a time varying frequency electromagnetic wave;

subjecting the treated region to the generated time varying frequency electromagnetic wave, wherein a selected voltage is applied to the generator from the electric AC power source such that the generator is triggered to produce the time varying frequency electromagnetic wave, capable of inducing an avalanche current in the water and/or on a surface of the substrate through the first and second excitation sites to shock or kill the organisms without the use of electrodes; and suppressing the avalanche current through the treated region.

19. The method as claimed in claim 18, wherein the substrate is made of an electrically non-conductive material, and the treated region is enclosed fully or partially.

20. The method as claimed in claim 18, wherein the frequency of the electromagnetic wave is between about 100 Hz and about 1 MHz.

21. The method as claimed in claim 18, wherein the electromagnetic wave has a sweeping frequency between about 1 Hz and about 1 KHz.

22. The method as claimed in claim 18, wherein the suppressor is selected from the group consisting of RLC circuit, inductance circuit, capacitor circuit, LC circuit, RL circuit and RC circuit.

* * * * *